United States Patent [19]
Curry

[11] Patent Number: 5,937,109
[45] Date of Patent: Aug. 10, 1999

[54] AUTOMOIRE PHASE ERROR CORRECTION FOR A HYPERACUITY HALFTONER

[75] Inventor: Douglas N. Curry, Menlo Park, Calif.

[73] Assignee: Xerox Corporation, Stamford, Conn.

[21] Appl. No.: 08/742,551

[22] Filed: Nov. 1, 1996

[51] Int. Cl.[6] .................................................. H04N 1/40
[52] U.S. Cl. .......................................... 382/300; 382/299
[58] Field of Search .................................. 382/299–300, 382/237, 270; 358/456–460

[56] References Cited

U.S. PATENT DOCUMENTS

| | | | |
|---|---|---|---|
| 5,265,210 | 11/1993 | Vatti et al. ................................. | 395/143 |
| 5,276,798 | 1/1994 | Peaslee et al. ............................ | 395/162 |
| 5,485,289 | 1/1996 | Curry ........................................ | 358/448 |
| 5,515,484 | 5/1996 | Sfarti et al. ............................... | 395/124 |
| 5,684,538 | 11/1997 | Nakaya et al. ............................ | 348/416 |

*Primary Examiner*—Thomas D. Lee
*Assistant Examiner*—Stephen Brinich
*Attorney, Agent, or Firm*—Fay, Sharpe, Beall, Fagan, Minnich & McKee, L.L.P.

[57] ABSTRACT

A hyperacuity printing system includes a halftoner (20) which converts pixel intensity values into multi-bit gray values which drive a laser diode (62). The halftoner (20) includes a halftoner memory (22), a phase error look-up table (50), and a modulator (60). The halftoner memory (22) stores a pregenerated halftone dot pattern as a plurality of halftone dot planes or cells (24), each representing an intensity value. The halftoner memory (22) is addressed by the integer portion of a screen coordinate (x,y) and the intensity value, and outputs spatial coordinates (r, θ) to an edge of the halftone dot nearest the screen coordinate. The fractional portion (xFRACT, yFRACT) of the screen coordinate (x,y) is combined with the outputted spatial coordinates (r,θ) to provide corrected coordinates ($r_c$,θ). The corrected coordinates ($r_c$,θ) address a modulator drive function (56) which generates the multi-bit gray value used to drive the modulator (60). By combining the fractional portion of the screen coordinates with the halftoner memory data, automoire is corrected, and marks are rendered more accurately.

8 Claims, 3 Drawing Sheets

AUTOMOIRE PHASE ERROR CORRECTION FOR A HYPERACUITY HALFTONER

BACKGROUND OF THE INVENTION

The present invention relates to the printing arts. It finds particular application in conjunction with halftoners and hyperacuity printers. However, it is to be appreciated that the present invention will also find application in conjunction with other printing systems and applications in which accurate rendering of marks are advantageous.

According to human visual research, the frequency response or resolution of a printing system need only exceed the resolving power of the human visual system. Such resolving power is known as visual acuity. However, there are human visual considerations that require the placement of edges 10–60 times more accurately than that indicated by frequency resolution considerations. These requirements are based on hyperacuity, or the visual systems ability to differentiate locally misaligned edges to a much greater extent than the interreceptor spacing of the eye. In this case, it is not the frequency response (resolution) of the visual system that is most important, but the ability to reckon edges with high precision. Therefore, there was a need to be able to place edges or transitions in images in both fastscan and process (slow scan) directions with precision greater than that of the actual printer resolution. A detailed description of the relationship between the human visual system and printer resolution can be found in the *Journal of Electronic Imaging*, April, 1993, Vol. 2(2), pgs. 138–146, entitled "Hyperacuity Laser Imager" by Douglas N. Curry, which is hereby incorporated by reference.

High quality printing depends on many factors including how much fidelity information can be passed to the printer from a data source or image generator. A purpose of printer electronics is to convert high fidelity, sampled image representation into a high band width, high resolution bit stream for delivery to a photoreceptor. The image generator can be either binary or gray, and is not restricted to a specific resolution or gray (multi-bit) depth. In general, the gray depth over an image can be variable to accommodate a physical interface with the imager subsystem or to adjust the fidelity of image information sent to the printer. The image generator can also download in advance of printing, halftoning and thresholding information tuned to any special characteristics of the imager and the desired imaging response. This download file is not image data, but rather is the contents of a look-up table used for halftoning or thresholding.

A resampling interpolator is typically found in the electronic pathway between the image generators and the output. The interpolator electronically maps data spatial positions into arbitrary misalignment of the imager and its mechanical process, as well as its customary use which provides resolution conversion. It executes a standard image processing function of interpolation, which can be linear interpolation. For a hyperacuity printer, the spot on the photoreceptor is tracked by appropriate electronics taking into account electronic registration requirements. To obtain a resample, the spot's current position is measured in units of addressability in both x (fastscan) and y (slow scan or process) dimensions. The addressability is not necessarily coincident with one of the integer sample positions, but instead is fractionally positioned.

Halftoners are used to convert the resampled information from the resampling interpolator into a binary map when pictorials are to be rendered. The halftoner includes a halftoner memory which stores pregenerated halftone cells which represent intensity information (for example, 256 values), as well as integer screen positions for each cell. For example, a halftone cell may be formed of 8×8 values. The intensity and screen position values are used to address the halftoner memory and a multi-bit output is retrieved which drives a gray modulator.

Automoire occurs when an individual halftone cell is produced with systematic quantization error. Rational tangent techniques for accessing halftone memory exhibit no moire because they have zero quantization error. When generating halftones by this method, each new memory location is chosen as an offset from the last location, with the offset being an integer. Unfortunately, because the offsets are restricted to integers, the number of halftone frequencies and angles used for incrementing the screen positions are severely limited. However, if fractional offsets are used, moire is introduced into the image caused by the periodic and systematic accumulation of quantization error. Typically, the screen position generated by the accumulators is an irrational number which has a fractional component. The halftoner memory, however, does not use fractional address locations. Thus, the fractional component of the screen position is discarded, and only the integer values are used to address the memory. Thus, inaccurate marks are rendered.

In accordance with the present invention, a hyperacuity halftoner is provided which corrects for automoire phase error by using the fractional component of screen positions.

SUMMARY OF THE INVENTION

In accordance with one aspect of the present invention, a method of rendering image data by an image developing device is provided. The image data is traversed across a plurality of screen coordinates and an associated intensity value for each screen coordinate is determined. The screen coordinate is separated into an integer component and a fractional component. The associated intensity value and the integer component of the screen coordinate is converted into edge location and orientation data. The edge location and orientation data is adjusted based on the fractional component of the screen coordinate to compensate for quantization error. The adjusted edge location and orientation data is converted into a multi-bit gray value and a mark is rendered corresponding to the multi-bit gray value at a selected fastscan and slow scan position.

In accordance with another aspect of the present invention, a halftoner for a hyperacuity printer is provided including a halftoner memory and a modulator driver. The halftoner memory is generated based on a predetermined halftone dot pattern and is addressed by an intensity value and an integer portion of an irrational screen position. The memory outputs a halftoner multi-bit data corresponding to the addressed location. The modulator driver converts the halftoner multi-bit data into a corresponding signals which drive a laser diode. The halftoner memory is configured to output an edge coordinate representing a location and orientation of a halftone dot edge nearest to the address location. A phase error corrector adjusts the edge coordinate based on a fractional portion of the irrational screen position. The modulator driver converts the adjusted edge coordinates into signals for driving a laser diode.

In accordance with another aspect of the present invention, a hyperacuity printer for rendering image data is provided. An address accumulator generates a plurality of screen positions in a selected frequency and a selected angle.

Each screen position includes an integer component and a fractional component. An image interpolator determines an intensity value for each screen position. A halftoner memory stores a predetermined halftone dot pattern which comprises a plurality of halftone dot cells. Each halftone dot cell represents a dot intensity. The halftoner memory is addressed by the integer component of the screen position and the determined intensity value for the screen position. A spatial coordinate is generated representing a distance and an angle from the screen position to a nearest edge of a halftone dot representing the determined intensity value. A corrector corrects the spatial coordinate by an offset error which is determined from the fractional component of the screen position. The corrected spatial coordinate is then converted into a multi-bit value. A modulator converts the multi-bit value into a corresponding control signal. An image rendering means renders a mark on a recording medium which corresponds to the control signal from the modulator.

One advantage of the present invention is that it compensates for quantization error by using the fractional portion of the screen coordinates.

Another advantage of the present invention is that the multi-bit output of a halftoner is corrected to reduce auto-moire phase error.

Another advantage of the present invention is that accurate marks are rendered by using both the integer and fractional portions of the screen coordinates.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
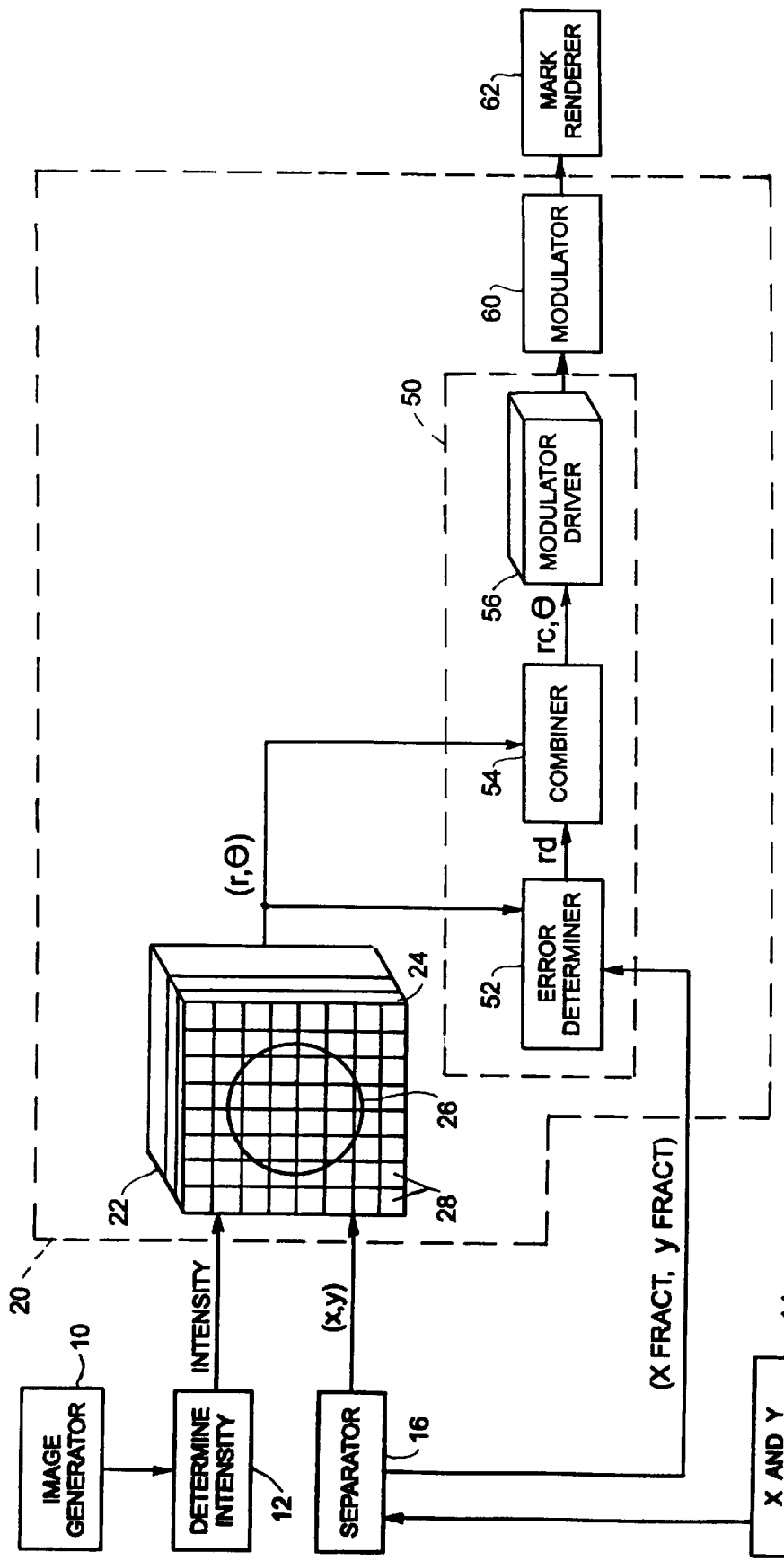
FIG. 1 illustrates a hyperacuity printing system in accordance with the present invention.

With reference to FIG. 1, image data to be rendered is generated by an image generator 10 such as a computer or scanner. An intensity determiner 12 determines the intensity or gray scale value of each image data value by, for example, interpolation. An address accumulator 14 traverses the image data in x and y directions by generating (x,y) coordinates in increments based on a selected increment frequency and increment angle. Each address designates a screen position (x,y) which has an associated intensity value from the image data that will ultimately be rendered as a mark.

The address information corresponds to the position of a laser diode spot in the x,y plane. The x and y accumulator 14 tracks the trajectory of the laser spot in a scan direction which for simplicity is shown in the Figures as being horizontal. The trajectory, however, moves through the memory at a screen angle which is, for example, a 30° angle.

The x and y accumulator increments fractionally so that irrational screen positions are generated which have an integer component (x,y) and a fractional component (xFRACT, yFRACT). A separator 16 separates the integer and fractional components. Only the integer component is used as the screen position (x,y) which is sent to a halftoner 20.

The halftoner 20 includes a halftoner memory 22 which is addressed by a plurality of intensity values, each value being represented by one halftone dot plane or halftone cell 24. In an 8-bit intensity example, the halftoner memory stores 256 intensity values, or in other words, 256 halftone dot planes 24. Each halftone dot plane 24 contains a halftone dot 26 defined by a dot shape and dot size which are determined from a pre-generated halftone dot pattern. The halftone dot pattern is typically generated based on the specific physical characteristics of the printing system for which the halftoner is used.

Each halftone dot plane 24 includes a plurality of tiles 28, for example, in an 8×8 grid. Each tile 28 represents a location which is addressed by the integer component of the screen position (x,y). Thus, each address into the halftoner memory 22 includes three values, one for the x dimension, one for the y dimension, and one for the intensity dimension. As explained, these addresses are provided by the x address accumulator, the y address accumulator, and the gray scale data value.

Figure 2:
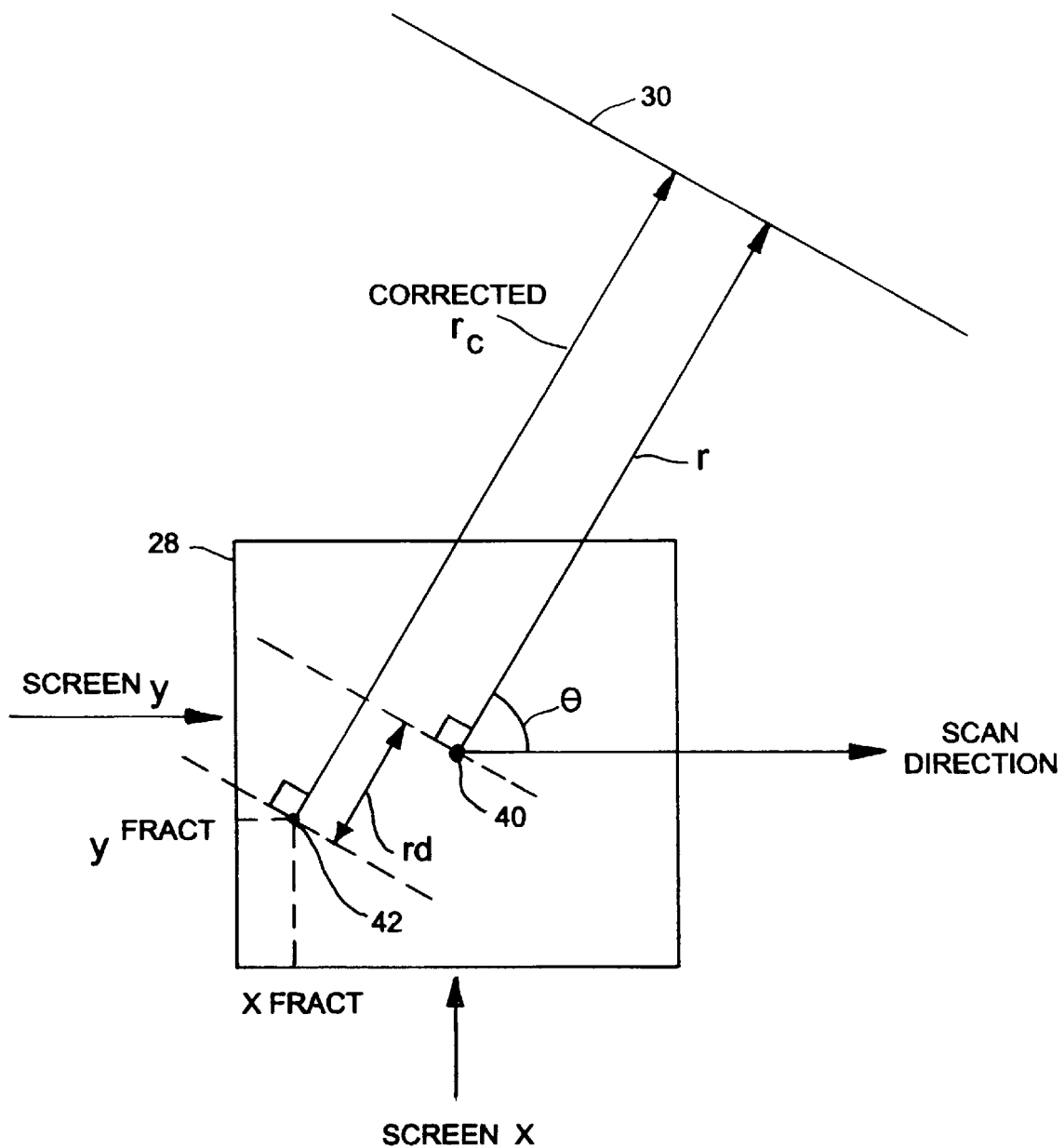
FIG. 2 illustrates how spatial coordinates of edges are determined in accordance with the present invention.

With reference to FIG. 2, an exemplary tile 28 of selected halftone plane or cell 24 is shown. With the three dimensional address (x,y, intensity), the intensity selects the halftone dot 24 which has a dot shape and size representing the determined intensity. The integer (x,y) position selects a tile 28 within the selected halftone cell. At this address, the halftoner memory 22 stores and outputs edge location and edge orientation information in relation to the selected tile 28. Preferably, the halftoner memory 22 stores and outputs spatial edge coordinates which represent a distance and angle to an edge 30 of the halftone dot 26 which is nearest to the selected tile 28 in the selected halftone cell.

The spatial coordinates are represented as polar coordinates (r,θ) where r is the shortest distance to an edge and θ is the angle between r and the scanning direction. However, the distance r is determined from a center 40 of the tile 28. Thus, a quantization error is created because the r value includes an error due to the fractional portion (xFRACT, yFRACT) of the screen coordinate (x,y) being at a position 42 which does not correspond to the center coordinate 40 of the tile 28. This quantization error creates a moire effect in the rendered image.

With further reference to FIG. 1, to compensate for the quantization error, a phase error correction table or correction processor 50 formed of software components, hardware components, or a combination of both is connected to the halftoner memory 22. An error determiner 52 receives (r,θ) and the fractional component (xFRACT, yFRACT) of the screen position and determines a corrected value of the spatial coordinate (r,θ). With reference again to FIG. 2, to determine an offset value rd, the fractional portion (xFRACT, yFRACT) of the screen coordinate (x,y) is combined with the outputted polar coordinates (r,θ). The offset value rd is the distance from the (xFRACT, yFRACT) position 42 to the center 40 of the tile in a direction parallel to r. In the preferred embodiment, rd is determined by:

$$rd = (xFRACT * \cos(\theta) + yFRACT * \sin(\theta))$$

A combining function 54 combines the offset value rd with the original r value generating a corrected r value $r_c$.

However, if the offset value is greater than the original r (as indicated by the magnitude of rd) and in the opposite direction than the original r (as indicated by the sign of rd), the angle must be reversed and the sign of $r_c$ must be reversed. This would happen if a correction passes over an edge. Similarly, based on the (xFRACT, yFRACT) location, the value of θ may also be adjusted by an angular offset to improve the edge information. Alternately, the error determiner 52 and combiner 54 can be a look-up table which stores predetermined offset values or other edge information based on the halftoner memory output.

Other information can also be stored at each tile location noting how the edge position changes with small, local changes in fractional locations. For instance, the first derivative (dr/ds) or local rate of change of the curve could be stored with r and θ, and appropriate computations for error would be made to correct the edge position.

Preferably, the phase error look-up table 50 includes a modulation drive function 56 which receives the corrected spatial coordinates ($r_c$,θ) and converts them to laser drive signals as appropriate for a hyperacuity printer. The drive signals drive a modulator 60, such as a digital to analog converter or pulse width modulator, or shift register. The modulator 60 generates control signals which drive a laser diode in the mark renderer 62.

Figure 3A:
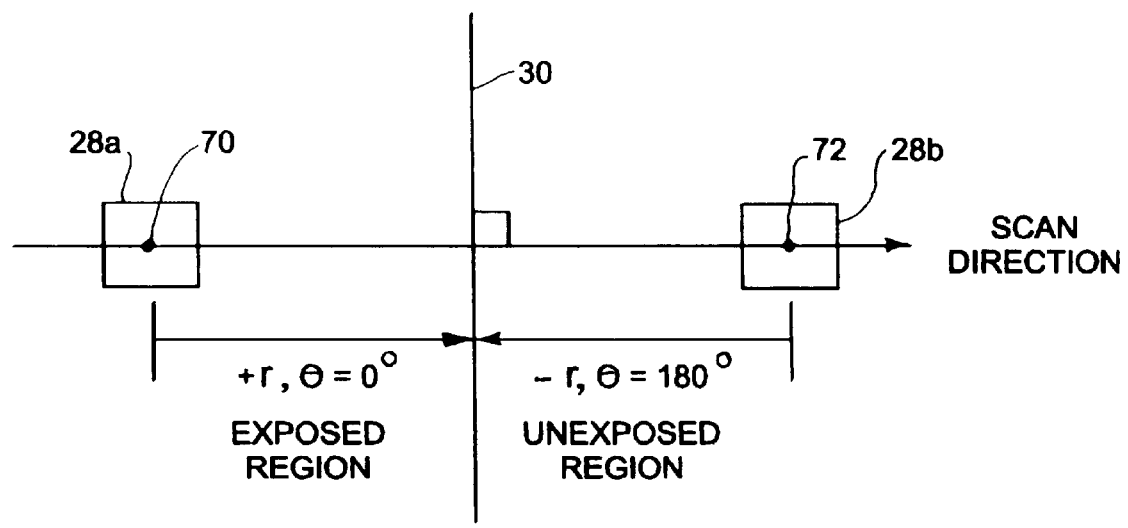
FIGS. 3A and 3B illustrate examples of determining an edge location and orientation.
Figure 3B:
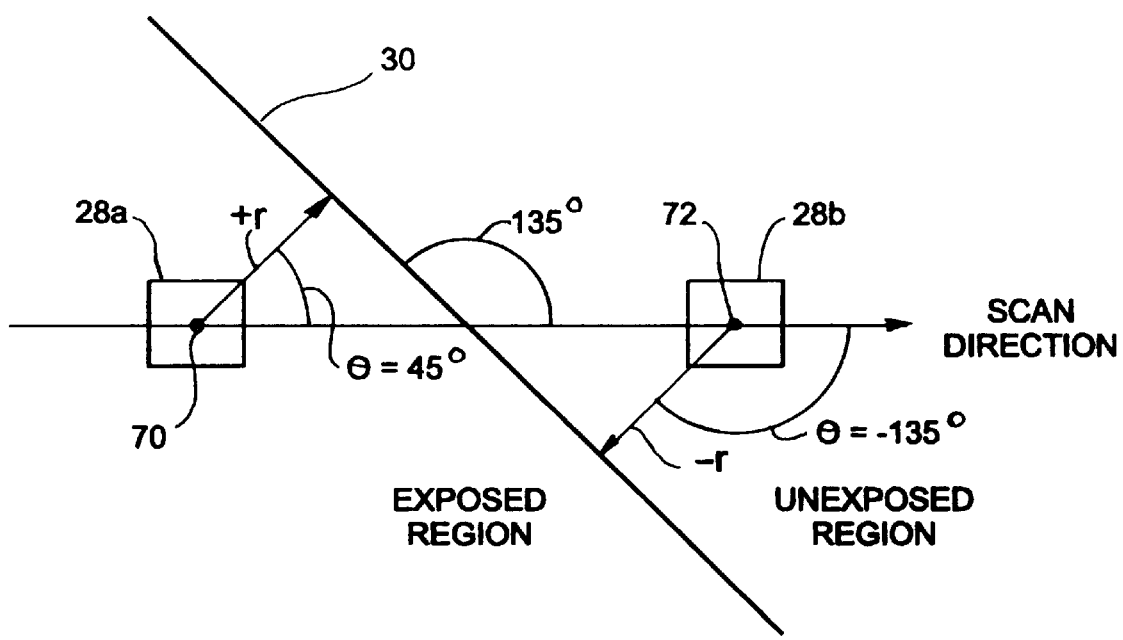

FIGS. 3a and 3b illustrate how the spatial coordinates (r,θ) define the location and orientation of a nearest edge. For exemplary purposes, the scan direction is horizontal and to the right. Polar coordinates are used to define the position of an edge. The absolute value of r represents the distance to the edge, and the angle θ, which spans a full circle from −180° to +180°, represents the orientation of the edge. Since the sign of r is not used to position the edge, it can be used instead to represent either an exposed region (+) or an unexposed region (−). For example, if the current screen position (x,y) addresses a tile 28a, the halftoner memory 22 outputs the nearest edge information from center point 70 of tile 28a as polar coordinates (r,θ) where r is a positive value, and θ is 0°. This (r,θ) indicates that the spot is in an exposed region, that an edge 30 is approaching and that the edge is vertical. Once the current screen position (x,y) crosses the edge 30, for example, at tile 28b having center point 72, the value of r becomes negative and θ is now 180° meaning that the edge 30 is behind the current spot and in an unexposed region.

FIG. 3b illustrates the edge 30 having a 135° angle from the scan direction. At a first tile 28a from its center 70, r is positive and θ is 45°. As the current spot travels in the scan direction, r decreases in value until the current spot (x,y) crosses the edge 30. For example, at tile 28b, r becomes negative (e.g., in an unexposed region) and θ is −135°. As previously explained, the halftoner memory 22 is generated based on a predetermined halftone dot pattern. Each memory plane or cell 24 represents an intensity value and comprises a plurality of locations or tiles 28. For each tile 28, the nearest edge 30 of the halftone dot to the tile 28 is computed and stored as (r,θ). Thus, once the memory 22 returns the (r,θ) coordinates, the location and orientation of the nearest edge 30 to the current spot (x,y) is known. The edge 30, of course, can also be curved. In order to provide improved estimates of r for curved edges, additional information may be used such as the derivative of r which is dr/ds. The derivative dr/ds can further be extrapolated to provide improved estimates of the edge location and orientation.

Alternately, instead of using spacial coordinates (r,θ), any type of edge location and edge orientation data can be predetermined, stored and outputted by memory 22. For example, rectilinear coordinates which include slope m and y-intercept b can be used to determine the location and orientation of an edge using well-known line equations such as y=mx+b.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalence thereof.

Having thus described the preferred embodiment, the invention is now claimed to be:

1. A method of rendering image data on a recording medium by an image developing device wherein the image data includes a plurality of intensity values each to be rendered at a fastscan and slowscan position on the recording medium, the method comprising:

traversing the image data across a plurality of screen coordinates and determining an associated intensity value for each screen coordinate;

separating the screen coordinate into an integer component and a fractional component;

converting the associated intensity value and the integer component of the screen coordinate into edge location and orientation data;

adjusting the edge location and orientation data based on the fractional component of the screen coordinate to compensate for quantization error;

converting the adjusted edge location and orientation data into a multi-bit gray scale value; and rendering a mark on the recording medium corresponding to the multi-bit gray value at a selected fastscan and slowscan position.

2. The method of rendering image data as set forth in claim 1, wherein the converting the associated intensity value includes:

accessing a halftoner memory with the associated intensity value to select a halftone dot cell which represents the associated intensity value and with the integer component of the screen coordinate to select a tile within the halftone dot cell;

generating the edge location and orientation data of a halftone dot edge within the halftone dot cell nearest to the selected tile.

3. The method of rendering image data as set forth in claim 1 wherein the adjusting includes:

determining an offset value between the screen coordinate and the fractional component of the screen coordinate and generating a corrected edge location and orientation data based on the offset value.

4. A halftoner for a hyperacuity printer including a halftoner memory and a modulator driver, the halftoner memory being generated based on a predetermined halftone dot pattern and outputting halftoner multi-bit data based on an address location comprising an intensity value and an integer portion of an irrational screen position, the modulator driver converting the halftoner multi-bit data into signals which drive a laser diode, further comprising:

the halftoner memory being configured for outputting the halftoner multi-bit data which includes an edge coordinate representing a location and orientation of a halftone dot edge nearest to the address location within the halftoner memory; and a phase error corrector for adjusting the edge coordinate based on a fractional portion of the irrational screen position, the adjusted edge coordinate being outputted to the modulator driver and converted into the signals for driving a laser diode.

5. The halftoner as set forth in claim 4 wherein the phase error corrector includes:

a look-up table connected between the halftoner memory and the modulator driver, the look-up table receiving as input the edge coordinate and corresponding fractional portion of the irrational screen position and generating the adjusted edge coordinate based on the received input.

6. A hyperacuity printer for rendering image data, the hyperacuity printer comprising:

an address accumulator for generating a plurality of screen positions in a selected frequency and a selected angle wherein each screen position is formed of an integer component and a fractional component and has an associated position within the image data;

an image interpolator for determining an intensity value for each associated position within the image data;

a halftoner memory for storing a predetermined halftone dot pattern including a plurality of halftone dot cells, each of the halftone dot cells corresponding to a different intensity value and storing a representation of a dot of corresponding intensity, the halftoner memory being addressed by the integer component of the screen position and the determined intensity value for the screen position to retrieve a spatial coordinate representing a distance and an angle from the screen position to a nearest edge of a halftone dot representing the determined intensity value;

a correction processor which corrects the spatial coordinate by an offset error determined from the fractional component of the screen position and converts the corrected spatial coordinate into a multi-bit value;

a modulator which converts the multi-bit value into a control signal; and image rendering means for rendering a mark on a recording medium corresponding to the control signal from the modulator.

7. The hyperacuity printer as set forth in claim 6, wherein the correction processor includes:

a means for determining the offset error based on the fractional component of the screen position;

a means for combining the offset error and the spatial coordinate to obtain the corrected spatial coordinate; and a modulator drive function for converting the corrected spatial coordinate into the multi-bit valve.

8. The hyperacuity printer as set forth in claim 6 wherein the rendering means includes a laser diode.

* * * * *